United States Patent [19]

Shindou et al.

[11] Patent Number: 5,059,492

[45] Date of Patent: Oct. 22, 1991

[54] HIGHLY CORROSION-RESISTANT, COLORED THIN FILM-COATED STEEL SHEET HAVING EXCELLENT PRESS-PROCESSABILITY AND SPOT-WELDABILITY

[75] Inventors: Yoshio Shindou; Motoo Kabeya, both of Kimitsu, Japan

[73] Assignee: Nippon Steel Corporation, Japan

[21] Appl. No.: 503,979

[22] Filed: Apr. 4, 1990

[30] Foreign Application Priority Data

Apr. 4, 1989 [JP] Japan .................. 1-083967

[51] Int. Cl.$^5$ ............... B32B 15/04; B32B 15/08; B32B 15/18; B32B 17/10
[52] U.S. Cl. .................. 428/625; 428/623; 428/624
[58] Field of Search ........... 428/625, 624, 623

[56] References Cited

U.S. PATENT DOCUMENTS 3,999,957 12/1976 Tongyai ..................... 428/659
4,876,160 10/1989 Shindou et al. ............ 428/632

FOREIGN PATENT DOCUMENTS

| | | |
|---|---|---|
| 45-24230 | 8/1970 | Japan . |
| 47-6882 | 2/1972 | Japan . |
| 52-44569 | 11/1977 | Japan . |
| 54-9616 | 4/1979 | Japan . |
| 55-5422 | 2/1980 | Japan . |
| 57-108292 | 7/1982 | Japan . |
| 58-19706 | 4/1983 | Japan . |
| 58-61291 | 4/1983 | Japan . |
| 58-138758 | 8/1983 | Japan . |
| 58-224174 | 12/1983 | Japan . |
| 60-70200 | 4/1985 | Japan . |
| 60-33192 | 8/1985 | Japan . |
| 60-174879 | 9/1985 | Japan . |
| 60-203677 | 10/1985 | Japan . |
| 63-35798 | 2/1988 | Japan . |
| 63-159480 | 7/1988 | Japan . |
| 1-00297 | 1/1989 | Japan . |
| 64-11830 | 1/1989 | Japan . |
| 2194249 | 3/1988 | United Kingdom . |

Primary Examiner—R. Dean
Assistant Examiner—David W. Schumaker
Attorney, Agent, or Firm—Pollock, Vande Sande & Priddy

[57] ABSTRACT

This invention provides a highly corrosion-resistant, colored thin film-coated steel sheet having excellent press-processability and spot-weldability, which comprises a plated steel sheet, a first layer of a sparingly soluble chromate film formed on surface(s) of the plated steel sheet and having a water soluble content of 1 to 30%, a $Cr^{6+}/Cr^{3+}$ ratio of 0.01 to 1.0 and a total chromium build-up of 10 to 150 $mg/m^2$ on one surface, and a second layer of a 0.3 to 5 $\mu$ thick solid coating film formed of an organic solvent-type coating composition, the solid coating film being comprised, based on the weight of the nonvolatile content, of (a) a urethanated epoxy ester resin having a number average molecular weight of 300 to 100,000: 30 to 90%,
(b) a hydrophilic polyamide resin having a polymerization degree of 50 to 1,000: 5 to 40%,
(c) a silica powder having an average particle diameter of 1 to 100 $\mu m$: 5 to 40%,
(d) a lubricant: 1 to 20%, and
(e) at least one member selected from a group consisting of inorganic, and insoluble azo-type, azolake-type or phthalocyanine-type organic pigments having an average particle diameter of 0.05 to 5 $\mu m$: 0.1 to 20%.

15 Claims, No Drawings

HIGHLY CORROSION-RESISTANT, COLORED THIN FILM-COATED STEEL SHEET HAVING EXCELLENT PRESS-PROCESSABILITY AND SPOT-WELDABILITY

BACKGROUND OF THE INVENTION

1. Field of the Invention

This invention relates to a highly corrosion-resistant surface-treated steel sheet having an unconventional appearance design and excellent functions such as press-processability, electrodeposition coatability and weldability, which is manufactured by forming a thin, uniformly colored coating film on surface(s) of a steel sheet plated with Zn, a steel sheet plated with a zinc-based alloy such as Zn-Cr, Zn-Ni, Zn-Fe, Zn-Al, Zn-Mg or the like, a steel sheet plated with a zinc-based composite containing a metal oxide such as $SiO_2$, $TiO_2$, $ZrO_2$, or the like, a steel sheet plated with Al, a steel sheet plated with alloyed zinc, or a steel sheet having a multilayer of these platings. Such a surface-treated steel has great usefulness in fields requiring its low cost and multifunctions.

2. Description of Related Art

Colored steel sheets have been employed to comply with users' need for omission of coating and high resistance to corrosion. And, recently, there has also been an increasing need for the coloring of plated steel sheets. However, it has not been possible to use any conventional colored steel sheet in a manner in which plated steel sheets are used, since they usually have a film thickness of 5 μm or more and therefore have insufficient weldability and press-processability.

That is, Japanese Patent KOKOKU (Post-Exam. Publns.) Nos. Sho 45-24230, 47-6882, etc., propose zinc-rich coating compositions, which permit electrodeposition coating. However, the press-processability of these coating compositions is poor and their corrosion resistance and weldability are also insufficient. Japanese Patent KOKOKU (Post-Exam. Publn.) No. Sho 52-44569, Japanese Patent KOKAI (Laid-Open) No. Sho 58-138758, Japanese Patent KOKOKU (Post-Exam. Publn.) Nos. Sho 54-9616 and 58-19706, etc., propose coating compositions incorporating an electrically conductive pigment, which remarkably improve the corrosion resistance of a zinc-plated steel sheet, etc., and also improve the weldability. Since, however, these coating compositions contain a comparatively large-sized pigment such as a zinc powder, metal powder, metal carbide, metal phosphide, or the like, films formed by electrodeposition coating of these coating compositions have a very rough, uneven surface texture and lack coating smoothness. And, since these coating compositions do not have any sufficient press-processability, either, the portions where these coating compositions can be applied are limited.

Further, Japanese Patent KOKOKU (Post-Exam. Publn.) No. Sho 60-33192, Japanese Patent KOKAI (Laid-Open) Nos. Sho 58-224174 and 60-174879, etc., propose organic composite silicate films and steel sheets coated with such a film, in which electrodeposition coating can be carried out to form thin films containing no electrically conductive pigment and having a thickness of 0.3 to 3 μm and steel sheets coated with these films. Although these organic composite silicate films and coated steel sheets have improved high corrosion resistance, weldability, press-processability, etc., they still have a problem in that an undercoat is seen through the films since the films are clear, or a handling problem in that the distinction between a coated surface and an uncoated surface is difficult when one surface of a steel sheet is coated. Furthermore, Japanese Patent KOKOKU (Post-Exam. Publn.) No. 55-5422, Japanese Patent KOKAI (Laid-Open) No. 58-61291, etc., describe colored precoat steel sheets of which the appearance design is improved by forming colored thick coating films having a thickness of 5 to 20 μm. Since, however, the films are thick and soft, these steel sheets have a defect in weldability and are liable to suffer scars in handling.

As described above, in fact, none of the conventionally proposed techniques have met the qualities presently required of a steel sheet coated with a colored thin film.

SUMMARY OF THE INVENTION

The object of this invention is to provide a colored plated steel sheet which permits not only welding but also press-processing and electrodeposition coating by coloring the surface of the plating of a plated steel sheet without losing the advantages of the plated steel sheet.

According to this invention, there is provided an organic composite steel sheet which comprises a substrate plated with zinc or a zinc-based alloy or a substrate plated with aluminum, a first layer of a sparingly soluble chromate film formed on the substrate and having a water soluble content of 1 to 30%, a $Cr^{6+}/Cr^{3+}$ ratio of 0.01 to 1.0 and a total chromium built-up, on one surface, of 10 to 150 mg/m$^2$, and a second layer of a 0.3 to 5 μm-thick solid film formed of a solvent-type coating composition comprised of, based on the weight of the nonvolatile content, 5 to 40% by weight of a hydrophilic polyamide resin having a polymerization degree of 50 to 1,000, 5 to 40% by weight of a silica fine powder having an average particle diameter of 1 to 100 mμ, 1 to 20% by weight of a lubricant such as polyethylene wax, etc., having a molecular weight of 1,000 to 10,000, 0.1 to 20% by weight of at least one member selected, as a sparingly soluble pigment, from the group consisting of insoluble azo, azolake or phthalocyanine-type organic pigments and inorganic pigments having an average particle diameter of 0.05 to 5 μm, and 30 to 90% by weight of a urethanated epoxy ester resin as a binder.

DETAILED DESCRIPTION OF PREFERRED EMBODIMENTS

This invention seeks to overcome degradation of press-processability and corrosion resistance involved in the formation of a thin film and a "seeing-through" problem of a colored film due to a thin film by combining the modification of a coloring coating composition with an undercoating film.

As described above, this invention is featured by a combination of the sparingly soluble chromate coating film with the solid coating film formed of a solvent-type colored organic polymer resin prepared by compounding a highly water-resistant epoxy-based resin, a hydrophilic polyamide resin, a fine powder silica and a coloring pigment. And, this invention has been completed on the basis of the following findings: The hydrophilic polyamide resin is necessary for smoothness of an electrodeposited film (gas pinholes, craters and organe peel). The use of no fine powder silica deteriorates adherence and corrosion resistance. A combination of the hydrophilic polyamide resin with the fine silica powder, i.e. a combination of a soft resin with a high-hardness resin, gives a good effect on a film lubricity, but the highly corrosion-resistant binder is required due to insufficient electrodeposition with the electrodeposited film. A specific insoluble coloring pigment is necessary to uniformly form a colored appearance film through which no undercoating film is seen even if it is a thin film. The undercoat chromate film has to be sparingly soluble to improve the secondary adherence of the electrodeposited film for water resistance.

Examples of the steel sheet used in this invention include a zinc-electroplated steel sheet, steel sheet hot-dipped with zinc, steel sheet electroplated with a zinc alloy (Zn-Ni, Zn-Cr and Zn-Fe), steel sheet electroplated with a zinc-based composite (Zn-Ni-$SiO_2$, Zn-Ni-$ZrO_2$, Zn-Cr-$SiO_2$, Zn-Cr-$ZrO_2$, etc.), steel sheet hot dipped with a zinc-based alloy (Zn-Al, Zn-Mg and Zn-Ni), steel sheet hot dipped with aluminum, steel sheet plated with alloyed zinc and multilayered steel sheets of these platings.

It is essential to increase $Cr^{3+}$ in the chromate film formed as a first layer on the plated steel sheet, in order to render the film sparingly soluble. As a method therefor there are a method of cathodic electrolysis in a chromating bath, and a coating-type chromating method in which $Cr^{6+}$ is reduced in $Cr^{3+}$ in the presence of an organic reducing agent such as saccharides or alcohols and the $Cr^{6+}$ and $Cr^{3+}$ are controlled in a suitable ratio. In this invention, either of these methods or a combination of these methods may be used. And, a colloidal silica (sol) may be incorporated.

The chromate film of this invention, obtained above, has a water soluble content (% chromium elution) of 1 to 30%, preferably 3 to 15%. The water soluble content of less than 1% is unsuitably short for the self-healing with $Cr^{6+}$, and the corrosion resistance is consequently reduced. When it exceeds 30%, the film swells due to eluted chromium, and secondary adherence and a pH at interface in cationic electrodeposition coating are reduced. As a result, a hydrogen gas generation is liable to remain on the electrodeposited film appearance in a form of pinholes (gas pinholes) or orange peel, and the appearance and appearance smoothness are undesirably hampered. The ratio of $Cr^{6+}/Cr^{3+}$ as components for the sparingly soluble chromate film of this invention is 0.01 to 1.0, preferably 0.03 to 0.5. When this ratio is less than 0.01, the achievement of high corrosion resistance is difficult due to insufficient self-healing effect with $Cr^{6+}$ (soluble chromium), and when it exceeds 1.0, chromium ($Cr^{6+}$) eluted into a treating liquid increases and builds up at an electrodeposition coating time or at a pretreatment time therefor such as alkali degreasing or treatment with a phosphate. Thus, the suitable bath balance of the treating liquid is hampered, which is undesirably a bar against the electrodeposition coatability including the treatment with a phosphate.

The build-up of the above sparingly soluble chromate film of this invention is 10 to 150 mg/$m^2$ (one surface) as a total chromium content, preferably 30 to 100 mg/$m^2$. When the total chromium content is less than 10 mg/$m^2$, the electrodeposition coating film does not exhibit adherence and high corrosion resistance as expected. And, when it is over 150 mg/$m^2$, various performances of the electrodeposition coating film such as adherence, press-processability, continuous spot-weldability, etc., are undesirably reduced.

The thin colored coating film as secondary layer is then formed on the chromate coating film. The requirements for this formation are as follows.

First, the urethanated epoxy ester resin as a binder is an epoxy-based binder resin which has a number average molecular weight of 300 to 100,000 and which is selected from the group consisting of an epoxy resin containing not less than 50% by weight, based on the weight of the nonvolatile content, of phenol in the molecule, an epoxy ester resin produced by reacting said epoxy resin with a dicarboxylic acid in the presence or absence of an amine catalyst and a urethanated epoxy ester resin produced by reacting said epoxy ester resin with a partial block isocyanate compound. The epoxy-based binder resin is used in an amount of 30 to 90% by weight based on the weight of the nonvolatile content. When the above number average molecular weight is less than 300, the adherence and corrosion resistance are reduced. And, a resin which can be used as a coating composition by dissolving it in an organic solvent have a molecular weight of up to 100,000, preferably 2,000 to 20,000.

When the amount of such an epoxy-based binder resin having a number average molecular weight in the above-specified range is less than 30% by weight based on the weight of the nonvolatile content, the adherence and processability of the resultant electrodeposition film are reduced. And, when it is over 90% by weight, the binder function for the coating composition decreases almost by half.

The hydrophilic polyamide resin used as a second resin component together with the above binder resin is one of the most important factors for the constitution of this invention, and featured by that it has many acid amide bonds and is highly hydrophilic and highly hygroscopic and that it has a high polymerization degree and a high molecular weight. In addition, the hydrophilic polyamide resin is selected from nylon 6 and nylon 6,6 or a copolymer of this nylon with some other nylon; polyether polyol-, polyester polyol-, or polybutadiene polyol-modified nylon; and aromatic polyamides such as poly-m-phenyleneisophthalamide, poly-p-phenyleneterephthalamide, etc. The present inventors have found that when such a hydrophilic polyamide resin is incorporated into a colored thin coating film, an electrodeposition liquid penetrates a coating film at an electrodeposition coating time, and electric resistance of the coating film is therefore lowered, whereby the electrodeposition property and electrodeposition coating film appearance (prevention of occurrence of gas pinholes, orange peel, etc.) are remarkably improved. This finding forms one of the essential bases for this invention. The large molecular weight of the polyamide resin is useful for prevention of the swelling and dissolving of a resin for the thin film-coated colored steel sheet in pretreatment procedures for electrodeposition coating, particularly at an alkali degreasing or electrodeposition coating time. That is, the polymerization degree is 50 to 1,000, preferably 50 to 500. When the polymerization degree is less than 50, the film undergoes dissolution at the above alkali degreasing time or electrodeposition time, and no uniform appearance is obtained. And, reduction of acid resistance occurs. The polymerization degree of over 1,000 is too high a molecular weight to meet the object of this invention. The incorporation of the polyamide resin is also desirable in view of impartation of flexibility and high processability into the coating film. The amount of the polyamide resin to be incorporated is 5 to 40% by weight, preferably 5 to 25% by weight based on the coating composition nonvolatile content. When this amount is less than 5% by weight, the uniform electrodeposition coating property (gas pin-holes or organce peel) is not improved as expected. And, when it exceeds 40% by weight, the adherence of the electrodeposition coating film is degraded.

In this invention, in order to improve corrosion resistance, a silica having an average particle diameter of 1 to 100 m$\mu$, preferably 5 to 50 m$\mu$ is used in an amount of 5 to 40% by weight, preferably 10 to 20% by weight, based on the coating composition nonvolatile content. When particles of the silica have a primary particle diameter of less than 1 m$\mu$, alkali resistance of the resultant composite coating film is undesirably low. And, when it is over 100 m$\mu$, there is no effect on improvement in corrosion resistance, and the resultant electrodeposition coating film has poor smoothness. Examples of such silica particles are fumed silica, colloidal silica, etc. Above all, the fumed silica is preferably used. The colloidal silica contains ammonium and alkali metal ions to stabilize its colloid, and these ions tend to lower corrosion resistance function of the film. When the amount of the silica particles is less than 5% by weight, there is no effect on improvement in corrosion resistance. And, the amount of over 40% by weight shows reduction in processability, and does not achieve the object of this invention.

The application requirements of the coloring pigment to be used to color the coating composition of this invention are as follows.

Of a variety of coloring pigments, the coloring pigments applicable to the coating composition in this invention are basically required to be sparingly soluble in water, and sparingly soluble and uniformly dipersible in an organic solvent for the coating composition. If the coloring pigment is soluble, it is eluted into an alkali degreasing liquid and a phosphate treatment liquid during the pretreatment for cationic electrodeposition coating even after it is solidified as a coating film. And, as result, the colored coating film undergoes color fading to a great extent, and it is also included in such treating liquids. Hence, the soluble coloring pigment is not practical. Further, when cationic electrodeposition coating or overcoating is effected thereon, the coloring pigment in the colored coating film is eluted, a color is transferred to the cationic electrodeposition coating film, and the coloring pigment is released into the overcoating film to cause a problem on bleeding resistance, etc. Therefore, the soluble coloring pigment is excluded from the scope of this invention.

Therefore, the requirements of the coloring pigment usable in the coating composition of this invention are that it should be sparingly soluble or insoluble in the solvent for the coating composition, and uniformly dispersible therein. Examples of the coloring pigment meeting such requirements are insoluble azo-, azolake- and phthalocyanine-type organic pigments or ordinary insoluble inorganic pigments.

When the coloring pigment has an average particle diameter of less than 0.05 $\mu$m, it undergoes secondary aggregation in the coating composition to form coarse particles, and the uniform coloring of the resultant coating film appearance is deteriorated. The average particle diameter of over 5 $\mu$m is not very desirable in view of coating film smoothness finish. For this reason, the average particle diameter of the coloring pigment is preferably 0.1 to 2.0 $\mu$m.

Further, when the amount of the coloring pigment incorporated into the coating composition of this invention is less than 0.1% by weight based on the coating composition nonvolatile content, the pigmentation degree of the resultant coating film is low, and the effects on the pigmentation degree for the design and the distinction of a coated surface by the eyes intended by this invention are small. And, when it is over 20% by weight, impractically, the effect of the pigment binder as said main resin is lost, and the uniform coatability of the resultant coating composition is reduced. The amount of the coloring pigment is preferably 0.3 to 10% by weight based on the coating composition nonvolatile content.

As described above, the thin colored coating film of this invention contains, as a nonvolatile content, the specified amounts of the epoxy-based binder resin, the hydrophilic polyamide resin, the fine powder silica and the insoluble coloring pigment. And, the combination of these four components synergistically improves electrodepsotion coatability, and gives a colored coating film having high corrosion resistance, high processability, excellent adherence, excellent smoothness and spot-weldability.

In addition, it is desirable to incorporate 1 to 20% by weight, preferably 1 to 10% by weight, based on the coating composition nonvolatile content, of a lubricant such as a polyolefin, a carboxylate, a metal carboxylate, a polyalkylene glycol or the like, or a lubricant powder such as molybdenum disulfide, a silicone compound, a fluorine compound or the like into the coating composition of this invention thereby to further improve the processability. A particularly preferable lubricant is a polyethylene wax having a molecular weight of 1,000 to 10,000. When the lubricant is incorporated, however, the amount thereof is up to 20% by weight at maximum. If the amount exceeds this limit, the adherence of the resultant electrodeposition film is undesirably reduced.

Further, in order to impart the coating composition of this invention with a low-temperature baking function, the coating composition can be thermoset by incorporating a curing agent such as a melamine resin, resol-type phenolic resin, polyisocyanate, or the like in a curing agent/epoxy resin ratio of 0.1/9.9 to 4/6 as solid contents by weight. The resol-type phenolic resin represented by the following formula is particularly preferable.

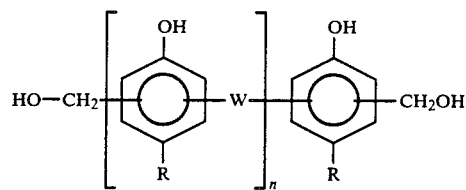

wherein n is 0 to 4, W is —CH$_2$— or —CH$_2$—O-CH$_2$—, and R is CH$_3$, H or —C(CH$_3$)$_2$OH.

The coating composition for a thin colored coating film of this invention may be coated on the coated steel sheet by a roll coat method, spray method, shower coat method, or the like, and the baking sheet temperature is 100 to 250° C. The dried coating film thickness is 0.3 to 5 $\mu$m, preferably 0.5 to 3 $\mu$m. When this thickness is less than 0.3 $\mu$m, the uniform colored coatability, corrosion resistance, press lubricity, etc., are reduced. And, when it is over 5 μm, the spot-weldability cannot be obtained stably as expected.

This invention will be illustrated by reference to Examples, in which % stands for % by weight based on the weight of the nonvolatile content of the coating composition unless otherwise specified.

The chromate film as first layer was formed on a steel sheet prepared by plating the surface of a low-carbon steel sheet having a thickness of 0.8 mm and a width of 1,000 mm with zinc or a zinc alloy given in Table 1. That is, the chromate film formation was carried out by a cathodic electrolytic method using a chromating liquid containing 3 to 10 g/l of alcohol-reduced $Cr^{3+}$ at a bath temperature of 45° C. at a current density of 15 A/dm$^3$ and/or a method of coating the surface with the chromating liquid. Then, as a second layer, an organic solvent-type colored coating composition comprised of given components was roll-coated thereon such that the resultant solid coating film had a thickness of 0.3 to 5 μm. And, the coated steel sheet was baked at a final sheet temperature of 150° C., cooled with water and dried.

In Table 1, examples of this invention for coated steel sheets prepared according to the above procedures are indicated as Nos. 1 to 78, and Comparative Examples as Nos. 79 to 106.

First, concerning the function and effect of the chromate film as a first layer on specific factors, Examples of this invention are shown in Nos. 1 to 19, and Comparative Examples in Nos. 79 to 84. These results show that it is essential to render the chromate film sparingly insoluble in order to allow the chromate film as an interlayer between a plating layer and an upper colored thin coating film to exhibit high-level total performances of a colored organic composite plated steel sheet such as corrosion resistance, adherence, etc., and that the $Cr^{6+}/Cr^{3+}$ amount in the chromate film and the build-up of the chromate film have to be adjusted to the ranges specified in this invention.

Secondary, concerning the function and effect of the specific factors constituting the colored coating film as second layer, Examples of this invention are shown in Nos. 20 to 72, and Comparative Examples in Nos. 85 to 106. Of these Examples, the function and effect of this invention concerning the molecular weight range and composition ratio of the binder resin are shown in No. 4 and Nos. 20 to 27, and those of Comparative Examples in Nos. 85 to 88.

These results clearly show that the suitable molecular weight and composition ratio specified in this invention are required to allow the pigment contained in a coating composition to exhibit the specified performances by dispersing it in a coating film.

Further, it is necessary to use the hydrophilic polyamide resin specified in this invention in combination in order to obtain excellent electrodeposition coatability by decreasing an electrodeposition interface resistance at an electrodeposition coating time. Examples of this invention therefor are shown in No. 4 and Nos. 28 to 35, and Comparative Examples in Nos. 89 to 92. These results clearly show that the hydrophilic polyamide resin has a great effect to balance the electrodeposition coatability and the other performances at an excellent level, and that the polymerization degree and composition ratio thereof are required to come under the ranges specified by this invention.

And, fumed silica is an essential factor to impart a colored organic composite plated steel sheet with high corrosion resistance. Comparative data on this point between this invention and Comparative Examples are shown in Nos. 4 and 36 to 45 and in Nos. 93 to 96. These results clearly show that, in order to achieve high corrosion resistance well-balanced with the other performances, it is necessary to select the fumed silica such that its particle diameter and composition ratio come within the ranges specified by this invention.

Furthermore, a wax is necessary to obtain excellent lubricity and press-processability. Examples of this invention using a polyethylene wax are shown in Nos. 46 to 53, and Comparative Examples in Nos. 97 to 100. These results show that the molecular weight and composition ratio of the polyethylene wax are required to come within the ranges specified in this invention.

The coloring pigment is used to color the coating composition of this invention. Examples of this invention for the coloring pigment are shown in Nos. 54 to 66 and 4, and Comparative Examples therefor in Nos. 103 to 106. These results show that any organic or inorganic coloring pigments are usable in this invention without any problem on performance if they are insoluble, and that the particle diameter and composition ratio thereof should come within the ranges specified in this invention in view of smoothness and uniform finish of colored appearance.

Examples of this invention for suitable thicknesses of the colored coating films are shown in Nos. 4 and 67 to 72, and Comparative Examples for such thickness in Nos. 101 and 102. These results show that the thickness lower limit should come within the range specified in this invention in view of uniformity of colored appearance, press-processability and corrosion resistance, and that the thickness upper limit also should come within the range specified in this invention in view of spot-weldability.

In addition, examples of plated steel sheets to which this invention can be applied are shown in Nos. 4 and 73 to 78, and the results show that this invention can be applied to all of these plated sheets.

TABLE 1

| | Plated steel sheet | | Chromate film (first layer) *1 | | | Colored organic composite coating film (second layer) | | | | | |
|---|---|---|---|---|---|---|---|---|---|---|---|
| | | | | | | Binder resin *2 | | Hydrophilic resin *3 | | Fumed silica *4 | |
| No. | Kind of plating | Build-up of plating g/m² | Build-up mg/m² | $Cr^{6+}/Cr^{3+}$ ratio | Water soluble content (%) | Number average molecular weight | Amount wt % | Polymerization degree | Amount wt % | Average particle diameter (μm) | Amount wt % |
| 1 This invention | Galvanized Zn—Ni (Ni 11%) | 20 | 50 | 0.01 | 10 | $1 \times 10^4$ | 60 | 300 | 20 | 8 | 15 |
| 2 This invention | Galvanized Zn—Ni (Ni 11%) | 20 | 50 | 0.03 | 10 | $1 \times 10^4$ | 60 | 300 | 20 | 8 | 15 |
| 3 This invention | Galvanized Zn—Ni (Ni 11%) | 20 | 50 | 0.05 | 10 | $1 \times 10^4$ | 60 | 300 | 20 | 8 | 15 |
| 4 This invention | Galvanized Zn—Ni (Ni 11%) | 20 | 50 | 0.1 | 10 | $1 \times 10^4$ | 60 | 300 | 20 | 8 | 15 |
| 5 This invention | Galvanized Zn—Ni (Ni 11%) | 20 | 50 | 0.3 | 10 | $1 \times 10^4$ | 60 | 300 | 20 | 8 | 15 |
| 6 This invention | Galvanized Zn—Ni (Ni 11%) | 20 | 50 | 0.5 | 10 | $1 \times 10^4$ | 60 | 300 | 20 | 8 | 15 |
| 7 This invention | Galvanized Zn—Ni (Ni 11%) | 20 | 50 | 1.0 | 10 | $1 \times 10^4$ | 60 | 300 | 20 | 8 | 15 |
| 8 This invention | Galvanized Zn—Ni (Ni 11%) | 20 | 50 | 0.1 | 1 | $1 \times 10^4$ | 60 | 300 | 20 | 8 | 15 |
| 9 This invention | Galvanized Zn—Ni (Ni 11%) | 20 | 50 | 0.1 | 3 | $1 \times 10^4$ | 60 | 300 | 20 | 8 | 15 |
| 10 This invention | Galvanized Zn—Ni (Ni 11%) | 20 | 50 | 0.1 | 5 | $1 \times 10^4$ | 60 | 300 | 20 | 8 | 15 |
| 11 This invention | Galvanized Zn—Ni (Ni 11%) | 20 | 50 | 0.1 | 15 | $1 \times 10^4$ | 60 | 300 | 20 | 8 | 15 |
| 12 This invention | Galvanized Zn—Ni (Ni 11%) | 20 | 50 | 0.1 | 20 | $1 \times 10^4$ | 60 | 300 | 20 | 8 | 15 |
| 13 This invention | Galvanized Zn—Ni (Ni 11%) | 20 | 50 | 0.1 | 30 | $1 \times 10^4$ | 60 | 300 | 20 | 8 | 15 |
| 14 This invention | Galvanized Zn—Ni (Ni 11%) | 20 | 10 | 0.1 | 10 | $1 \times 10^4$ | 60 | 300 | 20 | 8 | 15 |
| 15 This invention | Galvanized Zn—Ni (Ni 11%) | 20 | 30 | 0.1 | 10 | $1 \times 10^4$ | 60 | 300 | 20 | 8 | 15 |

TABLE 1-continued

| | | | | | | | | | | | |
|---|---|---|---|---|---|---|---|---|---|---|---|
| This invention | 16 | Galvanized Zn—Ni (Ni 11%) | 20 | 70 | 0.1 | 10 | $1 \times 10^4$ | 60 | 300 | 20 | 8 | 15 |
| This invention | 17 | Galvanized Zn—Ni (Ni 11%) | 20 | 100 | 0.1 | 10 | $1 \times 10^4$ | 60 | 300 | 20 | 8 | 15 |
| This invention | 18 | Galvanized Zn—Ni (Ni 11%) | 20 | 120 | 0.1 | 10 | $1 \times 10^4$ | 60 | 300 | 20 | 8 | 15 |
| This invention | 19 | Galvanized Zn—Ni (Ni 11%) | 20 | 150 | 0.1 | 10 | $1 \times 10^4$ | 60 | 300 | 20 | 8 | 15 |
| This invention | 20 | Galvanized Zn—Ni (Ni 11%) | 20 | 50 | 0.1 | 10 | $3 \times 10^2$ | 60 | 300 | 20 | 8 | 15 |
| This invention | 21 | Galvanized Zn—Ni (Ni 11%) | 20 | 50 | 0.1 | 10 | $3 \times 10^3$ | 60 | 300 | 20 | 8 | 15 |
| This invention | 22 | Galvanized Zn—Ni (Ni 11%) | 20 | 50 | 0.1 | 10 | $3 \times 10^4$ | 60 | 300 | 20 | 8 | 15 |
| This invention | 23 | Galvanized Zn—Ni (Ni 11%) | 20 | 50 | 0.1 | 10 | $10 \times 10^4$ | 60 | 300 | 20 | 8 | 15 |
| This invention | 24 | Galvanized Zn—Ni (Ni 11%) | 20 | 50 | 0.1 | 10 | $1 \times 10^4$ | 30 | 300 | 20 | 8 | 15 |
| This invention | 25 | Galvanized Zn—Ni (Ni 11%) | 20 | 50 | 0.1 | 10 | $1 \times 10^4$ | 40 | 300 | 20 | 8 | 15 |
| This invention | 26 | Galvanized Zn—Ni (Ni 11%) | 20 | 50 | 0.1 | 10 | $1 \times 10^4$ | 80 | 300 | 20 | 8 | 15 |
| This invention | 27 | Galvanized Zn—Ni (Ni 11%) | 20 | 50 | 0.1 | 10 | $1 \times 10^4$ | 90 | 300 | 20 | 8 | 15 |
| This invention | 28 | Galvanized Zn—Ni (Ni 11%) | 20 | 50 | 0.1 | 10 | $1 \times 10^4$ | 60 | 50 | 20 | 8 | 15 |
| This invention | 29 | Galvanized Zn—Ni (Ni 11%) | 20 | 50 | 0.1 | 10 | $1 \times 10^4$ | 60 | 100 | 20 | 8 | 15 |
| This invention | 30 | Galvanized Zn—Ni (Ni 11%) | 20 | 50 | 0.1 | 10 | $1 \times 10^4$ | 60 | 500 | 20 | 8 | 15 |
| This invention | 31 | Galvanized Zn—Ni (Ni 11%) | 20 | 50 | 0.1 | 10 | $1 \times 10^4$ | 60 | 1000 | 20 | 8 | 15 |
| This invention | 32 | Galvanized Zn—Ni (Ni 11%) | 20 | 50 | 0.1 | 10 | $1 \times 10^4$ | 60 | 300 | 5 | 8 | 15 |
| This invention | 33 | Galvanized Zn—Ni (Ni 11%) | 20 | 50 | 0.1 | 10 | $1 \times 10^4$ | 60 | 300 | 10 | 8 | 15 |

TABLE 1-continued

| | | | | | | | | | | | |
|---|---|---|---|---|---|---|---|---|---|---|---|
| This invention | 34 | Galvanized Zn—Ni (Ni 11%) | 20 | 50 | 0.1 | 10 | 1 × 10⁴ | 60 | 300 | 25 | 8 | 15 |
| This invention | 35 | Galvanized Zn—Ni (Ni 11%) | 20 | 50 | 0.1 | 10 | 1 × 10⁴ | 60 | 300 | 40 | 8 | 15 |
| This invention | 36 | Galvanized Zn—Ni (Ni 11%) | 20 | 50 | 0.1 | 10 | 1 × 10⁴ | 60 | 300 | 20 | 1 | 15 |
| This invention | 37 | Galvanized Zn—Ni (Ni 11%) | 20 | 50 | 0.1 | 10 | 1 × 10⁴ | 60 | 300 | 20 | 5 | 15 |
| This invention | 38 | Galvanized Zn—Ni (Ni 11%) | 20 | 50 | 0.1 | 10 | 1 × 10⁴ | 60 | 300 | 20 | 10 | 15 |
| This invention | 39 | Galvanized Zn—Ni (Ni 11%) | 20 | 50 | 0.1 | 10 | 1 × 10⁴ | 60 | 300 | 20 | 50 | 15 |
| This invention | 40 | Galvanized Zn—Ni (Ni 11%) | 20 | 50 | 0.1 | 10 | 1 × 10⁴ | 60 | 300 | 20 | 100 | 15 |
| This invention | 41 | Galvanized Zn—Ni (Ni 11%) | 20 | 50 | 0.1 | 10 | 1 × 10⁴ | 60 | 300 | 20 | 8 | 5 |
| This invention | 42 | Galvanized Zn—Ni (Ni 11%) | 20 | 50 | 0.1 | 10 | 1 × 10⁴ | 60 | 300 | 20 | 8 | 10 |
| This invention | 43 | Galvanized Zn—Ni (Ni 11%) | 20 | 50 | 0.1 | 10 | 1 × 10⁴ | 60 | 300 | 20 | 8 | 15 |
| This invention | 44 | Galvanized Zn—Ni (Ni 11%) | 20 | 50 | 0.1 | 10 | 1 × 10⁴ | 60 | 300 | 20 | 8 | 20 |
| This invention | 45 | Galvanized Zn—Ni (Ni 11%) | 20 | 50 | 0.1 | 10 | 1 × 10⁴ | 60 | 300 | 20 | 8 | 40 |
| This invention | 46 | Galvanized Zn—Ni (Ni 11%) | 20 | 50 | 0.1 | 10 | 1 × 10⁴ | 60 | 300 | 20 | 8 | 15 |
| This invention | 47 | Galvanized Zn—Ni (Ni 11%) | 20 | 50 | 0.1 | 10 | 1 × 10⁴ | 60 | 300 | 20 | 8 | 15 |
| This invention | 48 | Galvanized Zn—Ni (Ni 11%) | 20 | 50 | 0.1 | 10 | 1 × 10⁴ | 60 | 300 | 20 | 8 | 15 |
| This invention | 49 | Galvanized Zn—Ni (Ni 11%) | 20 | 50 | 0.1 | 10 | 1 × 10⁴ | 60 | 300 | 20 | 8 | 15 |
| This invention | 50 | Galvanized Zn—Ni (Ni 11%) | 20 | 50 | 0.1 | 10 | 1 × 10⁴ | 60 | 300 | 20 | 8 | 15 |
| This | 51 | Galvanized | 20 | 50 | 0.1 | 10 | 1 × 10⁴ | 60 | 300 | 20 | 8 | 15 |

TABLE 1-continued

| | | | | | | | | | | |
|---|---|---|---|---|---|---|---|---|---|---|
| invention | | | | | | | | | | |
| This invention | 52 | Galvanized Zn—Ni (Ni 11%) | 20 | 50 | 0.1 | 10 | 1 × 10⁴ | 60 | 300 | 20 | | 15 |
| This invention | 53 | Galvanized Zn—Ni (Ni 11%) | 20 | 50 | 0.1 | 10 | 1 × 10⁴ | 60 | 300 | 20 | | 15 |
| This invention | 54 | Galvanized Zn—Ni (Ni 11%) | 20 | 50 | 0.1 | 10 | 1 × 10⁴ | 60 | 300 | 20 | | 15 |
| This invention | 55 | Galvanized Zn—Ni (Ni 11%) | 20 | 50 | 0.1 | 10 | 1 × 10⁴ | 60 | 300 | 20 | | 15 |
| This invention | 56 | Galvanized Zn—Ni (Ni 11%) | 20 | 50 | 0.1 | 10 | 1 × 10⁴ | 60 | 300 | 20 | | 15 |
| This invention | 57 | Galvanized Zn—Ni (Ni 11%) | 20 | 50 | 0.1 | 10 | 1 × 10⁴ | 60 | 300 | 20 | | 15 |
| This invention | 58 | Galvanized Zn—Ni (Ni 11%) | 20 | 50 | 0.1 | 10 | 1 × 10⁴ | 60 | 300 | 20 | | 15 |
| This invention | 59 | Galvanized Zn—Ni (Ni 11%) | 20 | 50 | 0.1 | 10 | 1 × 10⁴ | 60 | 300 | 20 | | 15 |
| This invention | 60 | Galvanized Zn—Ni (Ni 11%) | 20 | 50 | 0.1 | 10 | 1 × 10⁴ | 60 | 300 | 20 | | 15 |
| This invention | 61 | Galvanized Zn—Ni (Ni 11%) | 20 | 50 | 0.1 | 10 | 1 × 10⁴ | 60 | 300 | 20 | | 15 |
| This invention | 62 | Galvanized Zn—Ni (Ni 11%) | 20 | 50 | 0.1 | 10 | 1 × 10⁴ | 60 | 300 | 20 | 8 | 15 |
| This invention | 63 | Galvanized Zn—Ni (Ni 11%) | 20 | 50 | 0.1 | 10 | 1 × 10⁴ | 60 | 300 | 20 | 8 | 15 |
| This invention | 64 | Galvanized Zn—Ni (Ni 11%) | 20 | 5 | 0.1 | 10 | 1 × 10⁴ | 60 | 300 | 20 | 8 | 15 |
| This invention | 65 | Galvanized Zn—Ni (Ni 11%) | 20 | 5 | 0.1 | 10 | 1 × 10⁴ | 60 | 300 | 20 | 8 | 15 |
| This invention | 66 | Galvanized Zn—Ni (Ni 11%) | 20 | 5 | 0.1 | 10 | 1 × 10⁴ | 60 | 300 | 20 | 8 | 15 |
| This invention | 67 | Galvanized Zn—Ni (Ni 11%) | 20 | 5 | 0.1 | 10 | 1 × 10⁴ | 60 | 300 | 20 | 8 | 15 |
| This invention | 68 | Galvanized Zn—Ni (Ni 11%) | 20 | 5 | 0.1 | 10 | 1 × 10⁴ | 60 | 300 | 20 | 8 | 15 |

TABLE 1-continued

| | No. | Coating | | | | | | | | | | |
|---|---|---|---|---|---|---|---|---|---|---|---|---|
| This invention | 69 | Galvanized Zn—Ni (Ni 11%) | 20 | 5 | 0.1 | 10 | $1 \times 10^4$ | 60 | 300 | 20 | 8 | 15 |
| This invention | 70 | Galvanized Zn—Ni (Ni 11%) | 20 | 5 | 0.1 | 10 | $1 \times 10^4$ | 60 | 300 | 20 | 8 | 15 |
| This invention | 71 | Galvanized Zn—Ni (Ni 11%) | 20 | 5 | 0.1 | 10 | $1 \times 10^4$ | 60 | 300 | 20 | 8 | 15 |
| This invention | 72 | Galvanized Zn—Ni (Ni 11%) | 20 | 5 | 0.1 | 10 | $1 \times 10^4$ | 60 | 300 | 20 | 8 | 15 |
| This invention | 73 | Galvanized Zn | 20 | 5 | 0.1 | 10 | $1 \times 10^4$ | 60 | 300 | 20 | 8 | 15 |
| This invention | 74 | Galvanized Zn—Fe (Fe 80%) | 20 | 5 | 0.1 | 10 | $1 \times 10^4$ | 60 | 300 | 20 | 8 | 15 |
| This invention | 75 | Hot Dipped Zn | 100 | 5 | 0.1 | 10 | $1 \times 10^4$ | 60 | 300 | 20 | 8 | 15 |
| This invention | 76 | Hot Dipped Zn—Fe | 45 | 5 | 0.1 | 10 | $1 \times 10^4$ | 60 | 300 | 20 | 8 | 15 |
| This invention | 77 | Hot Dipped Zn—Al (Al 5%) | 100 | 5 | 0.1 | 10 | $1 \times 10^4$ | 60 | 300 | 20 | 8 | 15 |
| This invention | 78 | Hot Dipped Al | 100 | 180 | 0.1 | 10 | $1 \times 10^4$ | 60 | 300 | 20 | 8 | 15 |
| Comparative Example | 79 | Galvanized Zn—Ni (Ni 11%) | 20 | 50 | 0.1 | 10 | $1 \times 10^4$ | 60 | 300 | 20 | 8 | 15 |
| Comparative Example | 80 | Galvanized Zn—Ni (Ni 11%) | 20 | 50 | 0.008 | 10 | $1 \times 10^4$ | 60 | 300 | 20 | 8 | 15 |
| Comparative Example | 81 | Galvanized Zn—Ni (Ni 11%) | 20 | 50 | 1.2 | 10 | $1 \times 10^4$ | 60 | 300 | 20 | 8 | 15 |
| Comparative Example | 82 | Galvanized Zn—Ni (Ni 11%) | 20 | 50 | 0.1 | 0.5 | $1 \times 10^4$ | 60 | 300 | 20 | 8 | 15 |
| Comparative Example | 83 | Galvanized Zn—Ni (Ni 11%) | 20 | 50 | 0.1 | 35 | $1 \times 10^4$ | 60 | 300 | 20 | 8 | 15 |
| Comparative Example | 84 | Galvanized Zn—Ni (Ni 11%) | 20 | 50 | 0.1 | 10 | $2 \times 10^2$ | 60 | 300 | 20 | 8 | 15 |
| Comparative Example | 85 | Galvanized Zn—Ni (Ni 11%) | 20 | 50 | 0.1 | 10 | $11 \times 10^4$ | 60 | 300 | 20 | 8 | 15 |
| Comparative Example | 86 | Galvanized Zn—Ni (Ni 11%) | 20 | 50 | 0.1 | 10 | $1 \times 10^4$ | 20 | 300 | 20 | 8 | 15 |
| Comparative Example | 87 | Galvanized Zn—Ni (Ni 11%) | 20 | 50 | 0.1 | 10 | $1 \times 10^4$ | 20 | 300 | 20 | 8 | 15 |

TABLE 1-continued

| | | | | | | | | | | | | |
|---|---|---|---|---|---|---|---|---|---|---|---|---|
| Comparative Example | 88 | Galvanized Zn—Ni (Ni 11%) | 20 | 50 | 0.1 | 10 | $1 \times 10^4$ | 95 | 300 | 20 | 8 | 15 |
| Comparative Example | 89 | Galvanized Zn—Ni (Ni 11%) | 20 | 50 | 0.1 | 10 | $1 \times 10^4$ | 60 | 30 | 20 | 8 | 15 |
| Comparative Example | 90 | Galvanized Zn—Ni (Ni 11%) | 20 | 50 | 0.1 | 10 | $1 \times 10^4$ | 60 | 1500 | 20 | 8 | 15 |
| Comparative Example | 91 | Galvanized Zn—Ni (Ni 11%) | 20 | 50 | 0.1 | 10 | $1 \times 10^4$ | 60 | 300 | 3 | 8 | 15 |
| Comparative Example | 92 | Galvanized Zn—Ni (Ni 11%) | 20 | 50 | 0.1 | 10 | $1 \times 10^4$ | 60 | 300 | 45 | 8 | 15 |
| Comparative Example | 93 | Galvanized Zn—Ni (Ni 11%) | 20 | 50 | 0.1 | 10 | $1 \times 10^4$ | 60 | 300 | 20 | 0.5 | 15 |
| Comparative Example | 94 | Galvanized Zn—Ni (Ni 11%) | 20 | 50 | 0.1 | 10 | $1 \times 10^4$ | 60 | 300 | 20 | 150 | 3 |
| Comparative Example | 95 | Galvanized Zn—Ni (Ni 11%) | 20 | 50 | 0.1 | 10 | $1 \times 10^4$ | 60 | 300 | 20 | 8 | 5.0 |
| Comparative Example | 96 | Galvanized Zn—Ni (Ni 11%) | 20 | 50 | 0.1 | 10 | $1 \times 10^4$ | 60 | 300 | 20 | 8 | 1.5 |
| Comparative Example | 97 | Galvanized Zn—Ni (Ni 11%) | 20 | 50 | 0.1 | 10 | $1 \times 10^4$ | 60 | 300 | 20 | 8 | 1.5 |
| Comparative Example | 98 | Galvanized Zn—Ni (Ni 11%) | 20 | 50 | 0.1 | 10 | $1 \times 10^4$ | 60 | 300 | 20 | 8 | 1.5 |
| Comparative Example | 99 | Galvanized Zn—Ni (Ni 11%) | 20 | 50 | 0.1 | 10 | $1 \times 10^4$ | 60 | 300 | 20 | 8 | 1.5 |
| Comparative Example | 100 | Galvanized Zn—Ni (Ni 11%) | 20 | 50 | 0.1 | 10 | $1 \times 10^4$ | 60 | 300 | 20 | 8 | 1.5 |
| Comparative Example | 101 | Galvanized Zn—Ni (Ni 11%) | 20 | 50 | 0.1 | 10 | $1 \times 10^4$ | 60 | 300 | 20 | 8 | 1.5 |
| Comparative Example | 102 | Galvanized Zn—Ni (Ni 11%) | 20 | 50 | 0.1 | 10 | $1 \times 10^4$ | 60 | 300 | 20 | 8 | 1.5 |
| Comparative Example | 103 | Galvanized Zn—Ni (Ni 11%) | 20 | 50 | 0.1 | 10 | $1 \times 10^4$ | 60 | 300 | 20 | 8 | 1.5 |
| Comparative Example | 104 | Galvanized Zn—Ni (Ni 11%) | 20 | 50 | 0.1 | 10 | $1 \times 10^4$ | 60 | 300 | 20 | 8 | 15 |
| Comparative Example | 105 | Galvanized Zn—Ni | 20 | 50 | 0.1 | 10 | $1 \times 10^4$ | 60 | 300 | 20 | 8 | 15 |

TABLE 1-continued

| Comparative Example | | | | | | | | | | | | | | Cationic electrode position (Power Top U100) | | | | |
|---|---|---|---|---|---|---|---|---|---|---|---|---|---|---|---|---|---|---|
| 106 Galvanized Zn—Ni (Ni 11%) | (Ni 11%) | 20 | 50 | 0.1 | 10 | 1 × 10⁴ | 60 | 300 | 20 | 8 | 15 | | | | | | | |
| | | Poly-ethylene wax *5 | | Coloring pigment *6 | | | | | | Alkali-resistance swelling of coating film *9 | | Electrode-position appearance *10 | | | | Adherence of electrode-position coating film *11 | |
| | No. | Molecular weight | Amount wt % | Type | Average particle diameter (μm) | Amount wt % | Coating film thickness *7 | Coloring uniformity of appearance *8 | | | | Gas pinhole | Crater | Orange peel | | Primary | Secondary |
| This invention | 1 | 3 × 10³ | 5 | D | 0.2 | 2.0 | 1.0 | ⊙ | | ⊙ | | ⊙ | ⊙ | ⊙ | | ⊙ | ⊙ |
| This invention | 2 | 3 × 10³ | 5 | D | 0.2 | 2.0 | 1.0 | ⊙ | | ⊙ | | ⊙ | ⊙ | ⊙ | | ⊙ | ⊙ |
| This invention | 3 | 3 × 10³ | 5 | D | 0.2 | 2.0 | 1.0 | ⊙ | | ⊙ | | ⊙ | ⊙ | ⊙ | | ⊙ | ⊙ |
| This invention | 4 | 3 × 10³ | 5 | D | 0.2 | 2.0 | 1.0 | ⊙ | | ⊙ | | ⊙ | ⊙ | ⊙ | | ⊙ | ⊙ |
| This invention | 5 | 3 × 10³ | 5 | D | 0.2 | 2.0 | 1.0 | ⊙ | | ⊙ | | ⊙ | ⊙ | ⊙ | | ⊙ | ⊙ |
| This invention | 6 | 3 × 10³ | 5 | D | 0.2 | 2.0 | 1.0 | ⊙ | | ⊙ | | ⊙ | ⊙ | ⊙ | | ⊙ | ⊙ |
| This invention | 7 | 3 × 10³ | 5 | D | 0.2 | 2.0 | 1.0 | ⊙ | | ⊙ | | ⊙ | ⊙ | ⊙ | | ⊙ | ⊙ |
| This invention | 8 | 3 × 10³ | 5 | D | 0.2 | 2.0 | 1.0 | ⊙ | | ⊙ | | ⊙ | ⊙ | ⊙ | | ⊙ | ⊙ |
| This invention | 9 | 3 × 10³ | 5 | D | 0.2 | 2.0 | 1.0 | ⊙ | | ⊙ | | ⊙ | ⊙ | ⊙ | | ⊙ | ⊙ |
| This invention | 10 | 3 × 10³ | 5 | D | 0.2 | 2.0 | 1.0 | ⊙ | | ⊙ | | ⊙ | ⊙ | ⊙ | | ⊙ | ⊙ |
| This invention | 11 | 3 × 10³ | 5 | D | 0.2 | 2.0 | 1.0 | ⊙ | | ⊙ | | ⊙ | ⊙ | ⊙ | | ⊙ | ⊙ |
| This invention | 12 | 3 × 10³ | 5 | D | 0.2 | 2.0 | 1.0 | ⊙ | | ⊙ | | ⊙ | ⊙ | ⊙ | | ⊙ | ⊙ |
| This invention | 13 | 3 × 10³ | 5 | D | 0.2 | 2.0 | 1.0 | ⊙ | | ⊙ | | ⊙ | ⊙ | ⊙ | | ⊙ | ⊙ |
| This invention | 14 | 3 × 10³ | 5 | D | 0.2 | 2.0 | 1.0 | ⊙ | | ⊙ | | ⊙ | ⊙ | ⊙ | | ⊙ | ⊙ |
| This invention | 15 | 3 × 10³ | 5 | D | 0.2 | 2.0 | 1.0 | ⊙ | | ⊙ | | ⊙ | ⊙ | ⊙ | | ⊙ | ⊙ |
| This invention | 16 | 3 × 10³ | 5 | D | 0.2 | 2.0 | 1.0 | ⊙ | | ⊙ | | ⊙ | ⊙ | ⊙ | | ⊙ | ⊙ |
| This invention | 17 | 3 × 10³ | 5 | D | 0.2 | 2.0 | 1.0 | ⊙ | | ⊙ | | ⊙ | ⊙ | ⊙ | | ⊙ | ⊙ |
| This invention | 18 | 3 × 10³ | 5 | D | 0.2 | 2.0 | 1.0 | ⊙ | | ⊙ | | ⊙ | ⊙ | ⊙ | | ⊙ | ⊙ |
| This invention | 19 | 3 × 10³ | 5 | D | 0.2 | 2.0 | 1.0 | ⊙ | | ⊙ | | ⊙ | ⊙ | ⊙ | | ⊙ | ⊙ |
| This invention | 20 | 3 × 10³ | 5 | D | 0.2 | 2.0 | 1.0 | ⊙ | | ⊙ | | ⊙ | ⊙ | ⊙ | | ⊙ | ⊙ |
| This invention | 21 | 3 × 10³ | 5 | D | 0.2 | 2.0 | 1.0 | ⊙ | | ⊙ | | ⊙ | ⊙ | ⊙ | | ⊙ | ⊙ |

TABLE 1-continued

| | | | | | | | | | | | | | | |
|---|---|---|---|---|---|---|---|---|---|---|---|---|---|---|
| This invention | 22 | 3 × 10³ | 5 | D | 0.2 | 2.0 | 1.0 | ⊙ | ⊙ | ⊙ | ⊙ | ⊙ | ⊙ | ⊙ |
| This invention | 23 | 3 × 10³ | 5 | D | 0.2 | 2.0 | 1.0 | | ⊙ | ⊙ | ⊙ | ⊙ | ⊙ | ⊙ |
| This invention | 24 | 3 × 10³ | 5 | D | 0.2 | 2.0 | 1.0 | | ⊙ | ⊙ | ⊙ | ⊙ | ⊙ | ⊙ |
| This invention | 25 | 3 × 10³ | 5 | D | 0.2 | 2.0 | 1.0 | | ⊙ | ⊙ | ⊙ | ⊙ | ⊙ | ⊙ |
| This invention | 26 | 3 × 10³ | 5 | D | 0.2 | 2.0 | 1.0 | | ⊙ | ⊙ | ⊙ | ⊙ | ⊙ | ⊙ |
| This invention | 27 | 3 × 10³ | 5 | D | 0.2 | 2.0 | 1.0 | | ⊙ | ⊙ | ⊙ | ⊙ | ⊙ | ⊙ |
| This invention | 28 | 3 × 10³ | 5 | D | 0.2 | 2.0 | 1.0 | | ⊙ | ⊙ | ⊙ | ⊙ | ⊙ | ⊙ |
| This invention | 29 | 3 × 10³ | 5 | D | 0.2 | 2.0 | 1.0 | | ⊙ | ⊙ | ⊙ | ⊙ | ⊙ | ⊙ |
| This invention | 30 | 3 × 10³ | 5 | D | 0.2 | 2.0 | 1.0 | | ⊙ | ⊙ | ⊙ | ⊙ | ⊙ | ⊙ |
| This invention | 31 | 3 × 10³ | 5 | D | 0.2 | 2.0 | 1.0 | | ⊙ | ⊙ | ⊙ | ⊙ | ⊙ | ⊙ |
| This invention | 32 | 3 × 10³ | 5 | D | 0.2 | 2.0 | 1.0 | | ⊙ | ⊙ | ⊙ | ⊙ | ⊙ | ⊙ |
| This invention | 33 | 3 × 10³ | 5 | D | 0.2 | 2.0 | 1.0 | | ⊙ | ⊙ | ⊙ | ⊙ | ⊙ | ⊙ |
| This invention | 34 | 3 × 10³ | 5 | D | 0.2 | 2.0 | 1.0 | | ⊙ | ⊙ | ⊙ | ⊙ | ⊙ | ⊙ |
| This invention | 35 | 3 × 10³ | 5 | D | 0.2 | 2.0 | 1.0 | | ⊙ | ⊙ | ⊙ | ⊙ | ⊙ | ⊙ |
| This invention | 36 | 3 × 10³ | 5 | D | 0.2 | 2.0 | 1.0 | | ⊙ | ⊙ | ⊙ | ⊙ | ⊙ | ⊙ |
| This invention | 37 | 3 × 10³ | 5 | D | 0.2 | 2.0 | 1.0 | | ⊙ | ⊙ | ⊙ | ⊙ | ⊙ | ⊙ |
| This invention | 38 | 3 × 10³ | 5 | D | 0.2 | 2.0 | 1.0 | | ⊙ | ⊙ | ⊙ | ⊙ | ⊙ | ⊙ |
| This invention | 39 | 3 × 10³ | 5 | D | 0.2 | 2.0 | 1.0 | | ⊙ | ⊙ | ⊙ | ⊙ | ⊙ | ⊙ |
| This invention | 40 | 3 × 10³ | 5 | D | 0.2 | 2.0 | 1.0 | | ⊙ | ⊙ | ⊙ | ⊙ | ⊙ | ⊙ |
| This invention | 41 | 3 × 10³ | 5 | D | 0.2 | 2.0 | 1.0 | | ⊙ | ⊙ | ⊙ | ⊙ | ⊙ | ⊙ |
| This invention | 42 | 3 × 10³ | 5 | D | 0.2 | 2.0 | 1.0 | | ⊙ | ⊙ | ⊙ | ⊙ | ⊙ | ⊙ |
| This invention | 43 | 3 × 10³ | 5 | D | 0.2 | 2.0 | 1.0 | | ⊙ | ⊙ | ⊙ | ⊙ | ⊙ | ⊙ |
| This invention | 44 | 3 × 10³ | 5 | D | 0.2 | 2.0 | 1.0 | | ⊙ | ⊙ | ⊙ | ⊙ | ⊙ | ⊙ |
| This invention | 45 | 3 × 10³ | 5 | D | 0.2 | 2.0 | 1.0 | | ⊙ | ⊙ | ⊙ | ⊙ | ⊙ | ⊙ |
| This invention | 46 | 1 × 10³ | 5 | D | 0.2 | 2.0 | 1.0 | | ⊙ | ⊙ | ⊙ | ⊙ | ⊙ | ⊙ |
| This invention | 47 | 5 × 10³ | 5 | D | 0.2 | 2.0 | 1.0 | | ⊙ | ⊙ | ⊙ | ⊙ | ⊙ | ⊙ |

TABLE 1-continued

| | No. | | | | | | | | | | | | | | |
|---|---|---|---|---|---|---|---|---|---|---|---|---|---|---|---|
| This invention | 48 | 1 × 10³ | 5 | D | 0.2 | 2.0 | 1.0 | ⊙ | ⊙ | ⊙ | ⊙ | ⊙ | ⊙ | ⊙ |
| This invention | 49 | 3 × 10³ | 1 | D | 0.2 | 2.0 | 1.0 | ⊙ | ⊙ | ⊙ | ⊙ | ⊙ | ⊙ | ⊙ |
| This invention | 50 | 3 × 10³ | 3 | D | 0.2 | 2.0 | 1.0 | ⊙ | ⊙ | ⊙ | ⊙ | ⊙ | ⊙ | ⊙ |
| This invention | 51 | 3 × 10³ | 7 | D | 0.2 | 2.0 | 1.0 | ⊙ | ⊙ | ⊙ | ⊙ | ⊙ | ⊙ | ⊙ |
| This invention | 52 | 3 × 10³ | 10 | D | 0.2 | 2.0 | 1.0 | ⊙ | ⊙ | ⊙ | ⊙ | ⊙ | ⊙ | ⊙ |
| This invention | 53 | 3 × 10³ | 20 | D | 0.2 | 2.0 | 1.0 | ⊙ | ⊙ | ⊙ | ⊙ | ⊙ | ⊙ | ⊙ |
| This invention | 54 | 3 × 10³ | 5 | D | 0.05 | 2.0 | 1.0 | ⊙ | ⊙ | ⊙ | ⊙ | ⊙ | ⊙ | ⊙ |
| This invention | 55 | 3 × 10³ | 5 | D | 1.0 | 2.0 | 1.0 | ⊙ | ⊙ | ⊙ | ⊙ | ⊙ | ⊙ | ⊙ |
| This invention | 56 | 3 × 10³ | 5 | D | 2.0 | 2.0 | 1.0 | ⊙ | ⊙ | ⊙ | ⊙ | ⊙ | ⊙ | ⊙ |
| This invention | 57 | 3 × 10³ | 5 | D | 5.0 | 2.0 | 1.0 | ⊙ | ⊙ | ⊙ | ⊙ | ⊙ | ⊙ | ⊙ |
| This invention | 58 | 3 × 10³ | 5 | D | 0.2 | 0.1 | 1.0 | ⊙ | ⊙ | ⊙ | ⊙ | ⊙ | ⊙ | ⊙ |
| This invention | 59 | 3 × 10³ | 5 | D | 0.2 | 0.3 | 1.0 | ⊙ | ⊙ | ⊙ | ⊙ | ⊙ | ⊙ | ⊙ |
| This invention | 60 | 3 × 10³ | 5 | D | 0.2 | 5.0 | 1.0 | ⊙ | ⊙ | ⊙ | ⊙ | ⊙ | ⊙ | ⊙ |
| This invention | 61 | 3 × 10³ | 5 | D | 0.2 | 10.0 | 1.0 | ⊙ | ⊙ | ⊙ | ⊙ | ⊙ | ⊙ | ⊙ |
| This invention | 62 | 3 × 10³ | 5 | D | 0.2 | 20.0 | 1.0 | ⊙ | ⊙ | ⊙ | ⊙ | ⊙ | ⊙ | ⊙ |
| This invention | 63 | 3 × 10³ | 5 | E | 0.2 | 2.0 | 1.0 | ⊙ | ⊙ | ⊙ | ⊙ | ⊙ | ⊙ | ⊙ |
| This invention | 64 | 3 × 10³ | 5 | A | 0.2 | 2.0 | 1.0 | ⊙ | ⊙ | ⊙ | ⊙ | ⊙ | ⊙ | ⊙ |
| This invention | 65 | 3 × 10³ | 5 | B | 0.2 | 2.0 | 1.0 | ⊙ | ⊙ | ⊙ | ⊙ | ⊙ | ⊙ | ⊙ |
| This invention | 66 | 3 × 10³ | 5 | C | 0.2 | 2.0 | 1.0 | ⊙ | ⊙ | ⊙ | ⊙ | ⊙ | ⊙ | ⊙ |
| This invention | 67 | 3 × 10³ | 5 | D | 0.2 | 2.0 | 0.3 | ⊙ | ⊙ | ⊙ | ⊙ | ⊙ | ⊙ | ⊙ |
| This invention | 68 | 3 × 10³ | 5 | D | 0.2 | 2.0 | 0.5 | ⊙ | ⊙ | ⊙ | ⊙ | ⊙ | ⊙ | ⊙ |
| This invention | 69 | 3 × 10³ | 5 | D | 0.2 | 2.0 | 0.8 | ⊙ | ⊙ | ⊙ | ⊙ | ⊙ | ⊙ | ⊙ |
| This invention | 70 | 3 × 10³ | 5 | D | 0.2 | 2.0 | 1.5 | ⊙ | ⊙ | ⊙ | ⊙ | ⊙ | ⊙ | ⊙ |
| This invention | 71 | 3 × 10³ | 5 | D | 0.2 | 2.0 | 2.0 | ⊙ | ⊙ | ⊙ | ⊙ | ⊙ | ⊙ | ⊙ |
| This invention | 72 | 3 × 10³ | 5 | D | 0.2 | 2.0 | 5.0 | ⊙ | ⊙ | ⊙ | ⊙ | ⊙ | ⊙ | ⊙ |
| This invention | 73 | 3 × 10³ | 5 | D | 0.2 | 2.0 | 1.0 | ⊙ | ⊙ | ⊙ | ⊙ | ⊙ | ⊙ | ⊙ |
| This invention | 74 | 3 × 10³ | 5 | D | 0.2 | 2.0 | 1.0 | ⊙ | ⊙ | ⊙ | ⊙ | ⊙ | ⊙ | ⊙ |

TABLE 1-continued

| Type | No. | | | | | | | | | | | | | |
|---|---|---|---|---|---|---|---|---|---|---|---|---|---|---|
| This invention | 75 | 3 × 10³ | 5 | D | 0.2 | 2.0 | 1.0 | ⊙ | ⊙ | ⊙ | ⊙ | ⊙ | ⊙ | ⊙ |
| This invention | 76 | 3 × 10³ | 5 | D | 0.2 | 2.0 | 1.0 | ⊙ | ⊙ | ⊙ | ⊙ | ⊙ | ⊙ | ⊙ |
| This invention | 77 | 3 × 10³ | 5 | D | 0.2 | 2.0 | 1.0 | ⊙ | ⊙ | ⊙ | ⊙ | ⊙ | ⊙ | ⊙ |
| This invention | 78 | 3 × 10³ | 5 | D | 0.2 | 2.0 | 1.0 | ⊙ | ⊙ | ⊙ | ⊙ | ⊙ | ⊙ | ⊙ |
| Comparative Example | 79 | 3 × 10³ | 5 | D | 0.2 | 2.0 | 1.0 | ⊙ | ⊙ | ○-△ | ⊙ | ⊙ | ○ | ○-△ |
| Comparative Example | 80 | 3 × 10³ | 5 | D | 0.2 | 2.0 | 1.0 | ⊙ | ⊙ | ⊙ | △ | ⊙ | ○ | △ |
| Comparative Example | 81 | 3 × 10³ | 5 | D | 0.2 | 2.0 | 1.0 | ⊙ | ⊙ | ⊙ | ⊙ | △ | ⊙ | ⊙ |
| Comparative Example | 82 | 3 × 10³ | 5 | D | 0.2 | 2.0 | 1.0 | ⊙ | ⊙ | △ | ⊙ | ⊙ | ○-⊙ | ○-△ |
| Comparative Example | 83 | 3 × 10³ | 5 | D | 0.2 | 2.0 | 1.0 | ⊙ | ⊙ | ⊙ | △-X | ⊙ | ⊙ | ⊙ |
| Comparative Example | 84 | 3 × 10³ | 5 | D | 0.2 | 2.0 | 1.0 | △-X | ⊙ | ⊙ | △-X | ⊙ | ⊙ | ○ |
| Comparative Example | 85 | 3 × 10³ | 5 | D | 0.2 | 2.0 | 1.0 | ⊙ | (Unsuitable as a coating composition) | | | | | |
| Comparative Example | 86 | 3 × 10³ | 5 | D | 0.2 | 2.0 | 1.0 | X | ⊙ | ⊙ | ⊙ | ⊙ | △ | △-X |
| Comparative Example | 87 | 3 × 10³ | 5 | D | 0.2 | 2.0 | 1.0 | ⊙ | (Unsuitable as a coating composition) | | | | | |
| Comparative Example | 88 | 3 × 10³ | 5 | D | 0.2 | 2.0 | 1.0 | X | ⊙ | ⊙ | X | ⊙ | ⊙ | △-X |
| Comparative Example | 89 | 3 × 10³ | 5 | D | 0.2 | 2.0 | 1.0 | ⊙ | (Unsuitable as a coating composition) | | | | | |
| Comparative Example | 90 | 3 × 10³ | 5 | D | 0.2 | 2.0 | 1.0 | ⊙ | ⊙ | ⊙ | ⊙ | ⊙ | ⊙ | ⊙ |
| Comparative Example | 91 | 3 × 10³ | 5 | D | 0.2 | 2.0 | 1.0 | ⊙ | X | ⊙ | X | ⊙ | △ | △-X |
| Comparative Example | 92 | 3 × 10³ | 5 | D | 0.2 | 2.0 | 1.0 | ⊙ | ⊙ | ⊙ | ○ | ○ | ⊙ | ⊙ |
| Comparative Example | 93 | 3 × 10³ | 5 | D | 0.2 | 2.0 | 1.0 | ⊙ | ⊙ | ○ | ⊙ | △ | ○ | ⊙ |
| Comparative Example | 94 | 3 × 10³ | 5 | D | 0.2 | 2.0 | 1.0 | △-X | ⊙ | ⊙ | △ | ⊙ | ⊙ | ⊙ |
| Comparative Example | 95 | 3 × 10³ | 5 | D | 0.2 | 2.0 | 1.0 | ⊙ | ⊙ | ⊙ | ⊙ | ⊙ | ⊙ | ⊙ |
| Comparative Example | 96 | 3 × 10³ | 5 | D | 0.2 | 2.0 | 1.0 | ⊙ | ⊙ | ⊙ | ⊙ | ⊙ | ⊙ | ⊙ |
| Comparative Example | 97 | 500 | 5 | D | 0.2 | 2.0 | 1.0 | ⊙ | ⊙ | ⊙ | ⊙ | ⊙ | ⊙ | ⊙ |
| Comparative Example | 98 | 2 × 10⁴ | 5 | D | 0.2 | 2.0 | 1.0 | ⊙ | ⊙ | ⊙ | ⊙ | ⊙ | ⊙ | ⊙ |
| Comparative Example | 99 | 3 × 10³ | 0.5 | D | 0.2 | 2.0 | 1.0 | ⊙ | ⊙ | ⊙ | ⊙ | ⊙ | ⊙ | ⊙ |
| Comparative Example | 100 | 3 × 10³ | 30 | D | 0.2 | 2.0 | 1.0 | ⊙ | ⊙ | ⊙ | ○ | ⊙ | ○ | △ |

TABLE 1-continued

| | | | | | | | | Press-processability | | Corrosion resistance | Capability in numbers of weld |
|---|---|---|---|---|---|---|---|---|---|---|---|
| Comparative Example | 101 | 3 × 10³ | 5 | D | 0.2 | 2.0 | 1.0 | ⊙ | ⊙ | ⊙ | X |
| Comparative Example | 102 | 3 × 10³ | 5 | D | 0.2 | 2.0 | 1.0 | ⊙ | ⊙ | ⊙ | ⊙ |
| Comparative Example | 103 | 3 × 10³ | 5 | D | 0.02 | 2.0 | 1.0 | ⊙ | ⊙ | ⊙ | △ |
| Comparative Example | 104 | 3 × 10³ | 5 | D | 10 | 2.0 | 1.0 | ⊙ | ⊙ | ⊙ | △-X |
| Comparative Example | 105 | 3 × 10³ | 5 | D | 0.2 | 0.05 | 1.0 | ○ | ○ | ○ | ○ |
| Comparative Example | 106 | 3 × 10³ | 5 | D | 0.2 | 30 | 1.0 | (Unsuitable as a coating composition) | | | X |

| | | Press-processability *12 | | Corrosion resistance *13 | Capability in numbers of weld *14 |
|---|---|---|---|---|---|
| No. | | Galling | Powdering | | |
| 1 | This invention | ⊙ | ⊙ | ⊙ | ⊙ |
| 2 | This invention | ⊙ | ⊙ | ⊙ | ⊙ |
| 3 | This invention | ⊙ | ⊙ | ⊙ | ⊙ |
| 4 | This invention | ⊙ | ⊙ | ⊙ | ⊙ |
| 5 | This invention | ⊙ | ⊙ | ⊙ | ⊙ |
| 6 | This invention | ⊙ | ⊙ | ⊙ | ⊙ |
| 7 | This invention | ⊙ | ⊙ | ⊙ | ⊙ |
| 8 | This invention | ⊙ | ⊙ | ⊙ | ⊙ |
| 9 | This invention | ⊙ | ⊙ | ⊙ | ⊙ |
| 10 | This invention | ⊙ | ⊙ | ⊙ | ⊙ |
| 11 | This invention | ⊙ | ⊙ | ⊙ | ⊙ |
| 12 | This invention | ⊙ | ⊙ | ⊙ | ⊙ |
| 13 | This invention | ⊙ | ⊙ | ⊙ | ⊙ |
| 14 | This invention | ⊙ | ⊙ | ⊙ | ⊙ |
| 15 | This invention | ⊙ | ⊙ | ⊙ | ⊙ |
| 16 | This invention | ⊙ | ⊙ | ⊙ | ⊙ |
| 17 | This invention | ⊙ | ⊙ | ⊙ | ⊙ |
| 18 | This invention | ⊙ | ⊙ | ⊙ | ⊙ |
| 19 | This invention | ⊙ | ⊙ | ⊙ | ⊙ |

TABLE 1-continued

| | | | | | |
|---|---|---|---|---|---|
| 20 | This invention | ⊙ | ⊙ | ⊙ | ⊙ |
| 21 | This invention | ⊙ | ⊙ | ⊙ | ⊙ |
| 22 | This invention | ⊙ | ⊙ | ⊙ | ⊙ |
| 23 | This invention | ⊙ | ⊙ | ⊙ | ⊙ |
| 24 | This invention | ⊙ | ⊙ | ⊙ | ⊙ |
| 25 | This invention | ⊙ | ⊙ | ⊙ | ⊙ |
| 26 | This invention | ⊙ | ⊙ | ⊙ | ⊙ |
| 27 | This invention | ⊙ | ⊙ | ⊙ | ⊙ |
| 28 | This invention | ⊙ | ⊙ | ⊙ | ⊙ |
| 29 | This invention | ⊙ | ⊙ | ⊙ | ⊙ |
| 30 | This invention | ⊙ | ⊙ | ⊙ | ⊙ |
| 31 | This invention | ⊙ | ⊙ | ⊙ | ⊙ |
| 32 | This invention | ⊙ | ⊙ | ⊙ | ⊙ |
| 33 | This invention | ⊙ | ⊙ | ⊙ | ⊙ |
| 34 | This invention | ⊙ | ⊙ | ⊙ | ⊙ |
| 35 | This invention | ⊙ | ⊙ | ⊙ | ⊙ |
| 36 | This invention | ⊙ | ⊙ | ⊙ | ⊙ |
| 37 | This invention | ⊙ | ⊙ | ⊙ | ⊙ |
| 38 | This invention | ⊙ | ⊙ | ⊙ | ⊙ |
| 39 | This invention | ⊙ | ⊙ | ⊙ | ⊙ |
| 40 | This invention | ⊙ | ⊙ | ⊙ | ⊙ |
| 41 | This invention | ⊙ | ⊙ | ⊙ | ⊙ |
| 42 | This invention | ⊙ | ⊙ | ⊙ | ⊙ |
| 43 | This invention | ⊙ | ⊙ | ⊙ | ⊙ |
| 44 | This invention | ⊙ | ⊙ | ⊙ | ⊙ |
| 45 | This invention | ⊙ | ⊙ | ⊙ | ⊙ |

TABLE 1-continued

| | | | | | |
|---|---|---|---|---|---|
| This invention | 46 | ⊙ | ⊙ | ⊙ | ⊙ |
| This invention | 47 | ⊙ | ⊙ | ⊙ | ⊙ |
| This invention | 48 | ⊙ | ⊙ | ⊙ | ⊙ |
| This invention | 49 | ⊙ | ⊙ | ⊙ | ⊙ |
| This invention | 50 | ⊙ | ⊙ | ⊙ | ⊙ |
| This invention | 51 | ⊙ | ⊙ | ⊙ | ⊙ |
| This invention | 52 | ⊙ | ⊙ | ⊙ | ⊙ |
| This invention | 53 | ⊙ | ⊙ | ⊙ | ⊙ |
| This invention | 54 | ⊙ | ⊙ | ⊙ | ⊙ |
| This invention | 55 | ⊙ | ⊙ | ⊙ | ⊙ |
| This invention | 56 | ⊙ | ⊙ | ⊙ | ⊙ |
| This invention | 57 | ⊙ | ⊙ | ⊙ | ⊙ |
| This invention | 58 | ⊙ | ⊙ | ⊙ | ⊙ |
| This invention | 59 | ⊙ | ⊙ | ⊙ | ⊙ |
| This invention | 60 | ⊙ | ⊙ | ⊙ | ⊙ |
| This invention | 61 | ⊙ | ⊙ | ⊙ | ⊙ |
| This invention | 62 | ⊙ | ⊙ | ⊙ | ⊙ |
| This invention | 63 | ⊙ | ⊙ | ⊙ | ⊙ |
| This invention | 64 | ⊙ | ⊙ | ⊙ | ⊙ |
| This invention | 65 | ⊙ | ⊙ | ⊙ | ⊙ |
| This invention | 66 | ⊙ | ⊙ | ⊙ | ⊙ |
| This invention | 67 | ⊙ | ⊙ | ⊙ | ⊙ |
| This invention | 68 | ⊙ | ⊙ | ⊙ | ⊙ |
| This invention | 69 | ⊙ | ⊙ | ⊙ | ⊙ |
| This invention | 70 | ⊙ | ⊙ | ⊙ | ⊙ |
| This invention | 71 | ⊙ | ⊙ | ⊙ | ⊙ |
| This invention | 72 | ⊙ | ⊙ | ⊙ | ⊙ |

TABLE 1-continued

| | | | | | | |
|---|---|---|---|---|---|---|
| This invention | 73 | ⊙ | | ⊙ | ⊙ | ⊙ |
| This invention | 74 | ⊙ | | ⊙ | ⊙ | ⊙ |
| This invention | 75 | ⊙ | | ⊙ | ⊙ | ⊙ |
| This invention | 76 | ⊙ | | ⊙ | ⊙ | ⊙ |
| This invention | 77 | ⊙ | | ⊙ | ⊙ | ⊙ |
| This invention | 78 | ⊙ | | ⊙ | ⊙ | ⊙ |
| Comparative Example | 79 | ○ | | ○-△ | △ | ○-△ |
| Comparative Example | 80 | ○ | | △ | ⊙ | ⊙ |
| Comparative Example | 81 | ⊙ | | ⊙ | △ | ⊙ |
| Comparative Example | 82 | ⊙ | | ⊙ | ⊙ | ⊙ |
| Comparative Example | 83 | ⊙ | | ⊙ | △-X | ⊙ |
| Comparative Example | 84 | ⊙ | | ⊙ | ⊙ | ⊙ |
| Comparative Example | 85 | ⊙ | | ⊙ | △ | ⊙ |
| Comparative Example | 86 | | | | | |
| Comparative Example | 87 | ○ | | △ | ○ | ⊙ |
| Comparative Example | 88 | △ | | △-○ | | ⊙ |
| Comparative Example | 89 | | | | | |
| Comparative Example | 90 | | | | | |
| Comparative Example | 91 | ⊙ | | ⊙ | ⊙ | ⊙ |
| Comparative Example | 92 | ⊙ | | ⊙ | ⊙ | ⊙ |
| Comparative Example | 93 | ○ | | ○ | X | ⊙ |
| Comparative Example | 94 | ⊙ | | ⊙ | △-X | ⊙ |
| Comparative Example | 95 | △ | | △-X | X | ⊙ |
| Comparative Example | 96 | ○ | | ○ | ⊙ | ⊙ |
| Comparative Example | 97 | ○-△ | | ○-△ | ○ | ⊙ |
| Comparative Example | 98 | | | | ○ | ⊙ |

TABLE 1-continued

| | | | | | | |
|---|---|---|---|---|---|---|
| Comparative Example | 99 | x | x | x | △ | ⊙ |
| Comparative Example | 100 | ⊙ | ⊙ | ⊙ | ⊙ | ⊙ |
| Comparative Example | 101 | △ | △-x | x | x | ⊙ |
| Comparative Example | 102 | ⊙ | ⊙ | ⊙ | ⊙ | x |
| Comparative Example | 103 | ⊙ | ⊙ | ⊙ | ⊙ | ⊙ |
| Comparative Example | 104 | ⊙ | ⊙ | ⊙ | ○ | ⊙ |
| Comparative Example | 105 | ⊙ | ⊙ | ⊙ | ⊙ | ⊙ |
| Comparative Example | 106 | | | | | |

(Notes)
*1: A ratio between the build-up of chromium eluted after immersion of one test piece in boiling water for 5 minutes and the initial chromium build-up of the same test piece was indicated as a water soluble content (%). The build up of chromium was converted as metal chromium.
*2: A mixture prepared by mixing a urethanated epoxy ester resin (supplied by Nippon Paint Co., Ltd.) with a resol-type phenolic resin (BKS-316, supplied by Showa Kobunshi K.K.) in a mixing ratio of 8/2 was used.
*3: Polypropylene glycol-modified nylon 6 (supplied by Toyo Rayon Co., Ltd.) was used.
*4: Aerosil 300 (supplied by Nippon Silica K.K.)
*5: Selidust 3620 (supplied by Hoechst Japan), a molecular weight 2,000.
*6: Type
A: Insoluble azo-type (Permanent Red F5R),
B: Insoluble azolake-type (alizarin lake),
C: Phthalocyanine-type (copper phthalocyanine),
D: Red iron oxide ($Fe_2O_3$),
E: Titanium white ($TiO_2$)
*7: Calculated according to a gravimetric method.
*8: Colored appearance (examined by the eyes)
⊙: Smooth and uniformly colored,
○: Smooth and uniformly colored with slight clearness,
△: Somewhat rough but colored uniformly,
x: Rough and colored nonuniformly
*9: Alkali defatting 2% SURFCLEANER (supplied by Nippon Paint Co., Ltd.), 65° C., immersed for 5 minutes.
⊙: No failure,
○: Slightly whitened,
△: Partly whitened,
x: Partially peeled
*10: Power Top U-100 (supplied by Nippon Paint Co., Ltd.), 250 V, 3 min, 20 μm, 28° C.
(Gas pinhole, crater)
⊙: No occurence,
○: A few points,
△: Less than 10 points,
x: Not less than 10 points
(Orange peel)
⊙: Smooth,
○: Slightly occurred,
△: Partly occurred,
x: Totally occurred TABLE 1-continued

*11: The secondary adherence was determined by immersing a test piece in warm water at 40° C. for 7 days, cross-cutting its coated surface and peeling with an adhesive tape.
(2 Mm × 100 cross cuts)
⊙: 100/100,
○: More than 95/100,
Δ: Not less than 90/100,
X: Less than 90/100
*12: Cylindrical press, 80 in diameter × 50 in height, without any lubricating oil
(Galling)
⊙: No occurrence,
○: Slightly occurred,
Δ: Partly occurred,
X: Totally occurred
(Powdering) Processed portion taping
⊙: No peel,
○: Slightly occurred,
Δ: Partly occurred,
X: Totally occurred
*13: Cylindrical press (80 in diameter × 50 in height), salt water spray test on processed portion (JIS Z-2371)
⊙: Not more than 1% white rust,
○: Not more than 5% white rust,
Δ: Not more than 10% white rust,
X: Over 10% rust occurrence
*14: Electrode terminal diameter 6 mm
Pressure: 200 kg · f, Current: 9 KA, Time: Not more than 10 cycles × 2,000, Sheet combination: Interior-exterior
(Coated on one surface)
⊙: Not less than 5,000 weld spots,
○: Not less than 4,000 weld spots,
Δ: Not more than 3,000 weld spots,
X: Not more than 2,000 weld spots As described above, the colored organic composite plated steel sheet of this invention is improved by coloring to make it possible to distinguish its coated surface by the eyes when it is handled particularly in press-processing, etc. And, the performance level belonging inherently to the steel sheet does not change at all even if it is colored, and high improvement in the added value of coated steel sheets for household appliances and automobile use are achieved. Further, the color tone, etc., can be adjusted within the scope of this invention, whereby the coated steel sheet can be fully used as a colored coated steel sheet in the field of household appliances.

What is claimed is:

1. A highly corrosion-resistant, colored thin film-coated steel sheet having excellent press-processability and spot-weldability, which comprises a plated steel sheet, a first layer of a sparingly soluble chromate film formed on at least one surface of the plated steel sheet said chromate film having a water soluble content of 1 to 30%, a $Cr^{6+}/Cr^{3+}$ ratio of 0.01 to 1.0 and a total chromium build-up of 10 to 150 mg/m$^2$ on one surface, and a second layer of a 0.3 to 5 $\mu$m-thick solid coating film formed of an organic solvent coating composition comprises of, based on the weight of the nonvolatile content:
   (a) a urethanated epoxy ester resin having a number average molecular weight of 300 to 100,000; 30 to 90%,
   (b) a hydrophilic polyamide resin having a polymerization degree of 50 to 1,000: 5 to 40%,
   (c) a silica powder having an average particle diameter of 1 to 100 m$\mu$: 5 to 40%,
   (d) a lubricant: 1 to 20%, and
   (e) at least one member selected from the group consisting of inorganic, and insoluble azo, azolake or phthalocyanine organic pigments having an average particle diameter of 0.05 to 5 $\mu$m: 0.1 to 20%.

2. A highly corrosion-resistant, colored thin film-coated steel sheet according to claim 1, wherein the plated steel sheet is one member from the group consisting of a steel sheet electroplated with zinc, a steel sheet hot-dipped with zinc, a steel sheet electroplated with a zinc-based composite, a steel sheet hot dipped with aluminum, a steel sheet plated with alloyed zinc, and a steel sheet plated with a composite of these.

3. A highly corrosion-resistant, colored thin film-coated steel sheet according to claim 1, wherein the total chromium build-up is 30 to 100 mg/m$^2$.

4. A highly corrosion-resistant, colored thin film-coated steel sheet according to claim 1, wherein the urethanated epoxy ester resin is selected from the group consisting of an epoxy resin containing not less than 50% by weight, based on the nonvolatile content, of phenol in the molecule, an epoxy ester resin produced by reacting said epoxy resin with a dicarboxylic acid in the presence or absence of an amine catalyst and a urethanated epoxy ester resin produced by reacting said epoxy ester resin with a partial block isocyanate compound.

5. A highly corrosion-resistant, colored thin film-coated steel sheet according to claim 1, wherein the urethanated epoxy ester resin has a number average molecular weight of 2,000 to 20,000.

6. A highly corrosion-resistant, colored thin film-coated steel sheet according to claim 1, wherein the hydrophilic polyamide resin is selected from the group consisting of nylon 6, nylon 6,6,- a copolymer thereof with some other nylon; polyether polyol-, polyester-polyol - and polybutadiene polyol-modified nylon; and aromatic polyamides.

7. A highly corrosion-resistant, colored thin film-coated steel sheet according to claim 1, wherein the silica powder has an average particle diameter of 5 to 50 m$\mu$.

8. A highly corrosion-resistant, colored thin film-coated steel sheet according to claim 1, wherein the coloring pigment has an average particle diameter of 0.1 to 2.0 $\mu$m.

9. A highly corrosion-resistant, colored thin film-coated steel sheet according to claim 1, wherein the lubricant is selected from the group consisting of polyolefins, carboxylates, a metal carboxylate, a polyalkylene glycol, molybdenum disulfide, a silicone compound and a fluorine compound.

10. A highly corrosion-resistant, colored thin film-coated steel sheet according to claim 1, wherein the lubricant is a polyethylene wax having a molecular weight of 1,000 to 10,000.

11. The highly corrosion-resistant, colored thin film-coated steel sheet according to claim 2 wherein said plated steel sheet is selected from the group consisting of steel sheet electroplated with a zinc alloy, and steel sheet hot-dipped with zinc alloy.

12. The highly corrosion-resistant, colored thin film-coated steel sheet according to claim 2 wherein said plated steel sheet is a steel sheet electroplated with a zinc-based composite selected from the group consisting of Zn-Ni-SiO$_2$, Zn-NiZrO$_2$, Zn-Cr-SiO$_2$, and Zn-Cr-ZrO$_2$.

13. The highly corrosion-resistant, colored thin film-coated steel sheet according to claim 2 wherein said plated steel sheet is a steel sheet electroplated with a zinc alloy selected from the group consisting of Zn-Ni, ZnCr and Zn-Fe.

14. The highly corrosion-resistant, colored thin film-coated steel sheet according to claim 2 wherein said plated steel sheet is a steel sheet hot-dipped with a zinc alloy selected from the group consisting of Zn-Al, Zn-Mg, and Zn-Ni.

15. The highly corrosion-resistant, colored thin film-coated steel sheet according to claim 2, wherein said polyamide resin is selected from the group consisting of poly m-phenyleneisophthalamide, and poly-p-phenyleneterephthalamide.

* * * * *